Nov. 22, 1938.  I. I. NELSON  2,137,882
RELIEF VALVE
Original Filed Dec. 17, 1932
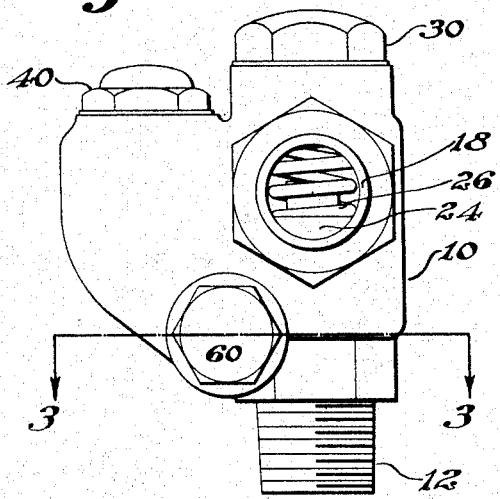
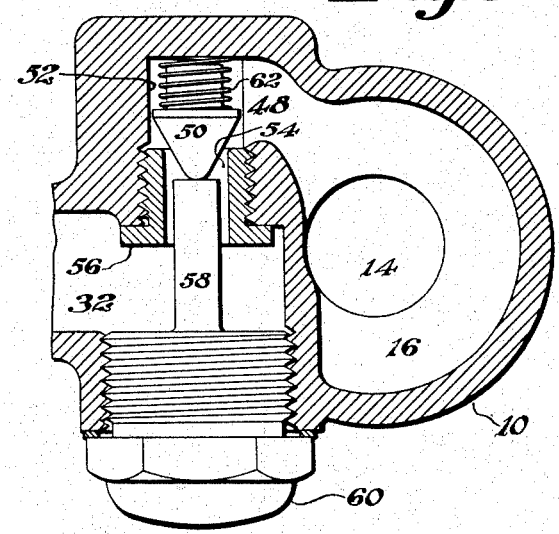
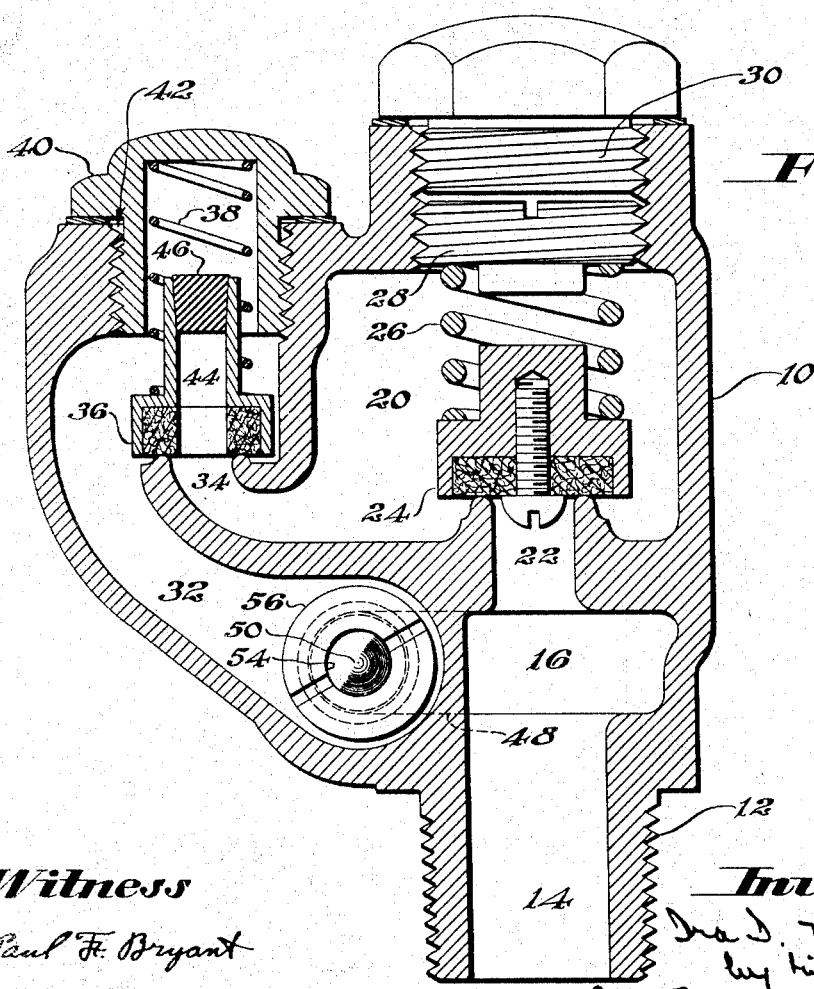

Patented Nov. 22, 1938

2,137,882

UNITED STATES PATENT OFFICE 2,137,882

RELIEF VALVE

Ira I. Nelson, Boston, Mass.

Application December 17, 1932, Serial No. 647,707
Renewed January 26, 1937

4 Claims. (Cl. 277—46)

The present invention relates to relief valves and more particularly to relief valves to be used in connection with domestic hot water boilers.

The object of the invention, generally speaking, is to permit replacement of the fusible plug in a relief valve without requiring the shut-down of the hot water system pending and during replacement. A further object of the invention is to provide in a single valve the four functions of relieving on both excessive temperature and pressure within the system, vacuum within the system, and shutting off flow to the temperature relief means during replacement thereof without interference with the delivery of hot water from the system or with the relieving of excessive pressures.

With these and other objects in view, one feature of the invention contemplates the provision within a valve having separate temperature and pressure relief means, of means within the valve for temporarily shutting off the flow of water to the temperature relief means to permit replacement thereof, or examination, or for any other purpose. A further feature of the invention contemplates the provision of pressure and temperature relief means independently located with separate passages thereto and a shut-off located in the temperature relief passage to temporarily cut off the supply of water thereto for replacement or other purposes.

In a simple and efficient embodiment of the invention, the valve is intended to relieve for both pressure and temperature and against vacuum, the temperature relief means being in the form of a fusible plug located in the vacuum valve which communicates with the inlet chamber through an independent passage. Located in this passage is a shut-off, which may be actuated manually to provide access to the fusible plug and vacuum valve and permit replacement. The shut-off valve is caused to yieldingly engage with its seat when closed, and may serve to relieve vacuum within the system if this should occur during the time that the valve is normally closed.

It will be evident to those skilled in the art that access to the temperature relief member is provided to permit substitution or replacement without dismantling the valve. It makes no difference whether the temperature relief means is in the form of a fusible plug or some other form of vent closing and opening device actuated by excessive temperature.

Still further features of the invention consist of certain novel features of construction, combinations and arrangements of parts hereinafter described and claimed.

The invention is shown in its preferred form in the accompanying drawing, in which Fig. 1 is a front elevation of the relief valve, Fig. 2 is an enlarged sectional front elevation, and Fig. 3 is an enlarged sectional plan on line 3—3 of Fig. 1.

The valve casing 10 is provided with an externally threaded inlet member 12 by means of which the valve may be connected to the boiler either directly or through suitable piping as desired. An inlet passage 14 connects the boiler to an inlet chamber 16. A drain pipe may be connected to an internally threaded outlet 18 which opens directly into an outlet chamber 20. A pressure relief port 22 between the inlet and outlet chambers is normally blocked by a pressure valve 24 acted upon by a heavy compressed spring 26, the upper end of which is secured by an adjustable abutment screw 28, loosely threaded into the valve casing. A threaded plug 30 serves to prevent leakage at this point.

When the pressure within the inlet chamber exceeds a certain predetermined value, the pressure valve 24 is lifted against the spring 26, and the inlet chamber 16 is vented through the port 22.

The inlet chamber 16 normally communicates with a by-pass chamber 32. A vacuum relief port 34 between the by-pass and outlet chambers is normally blocked by a vacuum valve 36, acted upon by a light compressed spring 38 and also by the boiler pressure. A hollow-headed screw 40 serves to compress and retain the spring 38 and also to seal the valve access opening 42. Upon the possible formation of a partial vacuum within the boiler, atmospheric pressure within the outlet chamber 20 lifts the vacuum valve 36 against the pressure of the light spring 38, thus allowing air to enter the boiler, thereby relieving the vacuum.

The vacuum valve 36 is provided with an axial passage 44 which is closed by means of a tapered fusible plug 46. Should the temperature within the boiler exceed a certain predetermined value, the fusible plug will be melted, thus venting the boiler through the axial passage 44 and the vacuum relief port 34.

Should the fusible plug 46 be melted out, fluid must be prevented from entering the by-pass chamber 32 during replacement, otherwise fluid would issue from the access opening 42 upon the necessary removal of the screw 40. Therefore, an intermediate passage 48, which connects the inlet chamber 16 to the by-pass chamber 32, is provided with an auxiliary valve 50 which may be rendered operative at will, and which when closed prevents fluid from entering the by-pass chamber 32. The auxiliary valve 50 is retained in a cylindrical recess 52, and during normal operation of the boiler is prevented from closing an axial port 54 through a screw-threaded bushing 56 by an axial stud 58 integral with a threaded plug 60. Partial removal of the plug 60 releases the auxiliary valve 50, which then blocks the axial port 54, being acted upon by a light compressed spring 62 and also the boiler pressure. Fluid is thus prevented from entering the by-pass chamber.

The hollow-headed screw 40 may now be removed without fluid gushing from the access opening 42. The vacuum valve 36 may then be removed for the insertion of a new fusible plug.

Since overheating of the fluid in the boiler is a condition which may be guarded against once the tendency is noted, it may be desirable to continue operation of the boiler as soon as the temperature falls to a safe degree. Therefore, pending the replacement of the fusible plug 46, the threaded plug 60 may be partially removed. The auxiliary valve 50 then not only serves to prevent the waste of fluid, but also as a vacuum relief valve, and being located as it is in the intermediate passage 48, does not interfere with the operation of the pressure relief valve 24.

What is claimed is:

1. A relief valve comprising inlet and outlet chambers, a passage communicating between the chambers, a pressure relief valve normally closing the passage, a second passage communicating with the chambers, a vacuum relief valve in the second passage, a fusible plug mounted in the vacuum valve for relieving the occurrence of excessive temperature a second vacuum relief valve for closing the second passage and manually operated means for holding the second relief valve open.

2. A relief valve comprising inlet and outlet chambers, a passage communicating between the chambers, a pressure relief valve normally closing the passage, a second passage communicating with the chambers, a vacuum relief valve in the second passage, a fusible plug associated with the vacuum valve for relieving fluid pressure upon the occurrence of excessive temperature rises shut-off located between the inlet chamber and vacuum valve and manually operated means entering the second passage between the fusible plug and th eshut-off for actuating the shut-off.

3. A relief valve comprising inlet and outlet chambers, a passage communicating between the chambers, a pressure relief valve normally closing the passage, a second passage communicating with the chambers, a vacuum relief valve in the second passage, a fusible plug associated with the vacuum valve for relieving fluid pressure upon the occurrence of excessive temperature rise, a shut-off located between the inlet chamber and vacuum valve, means for yieldingly urging the shut-off valve against its seat and manually operated means for normally retaining the shut-off valve out of engagement with its seat and to allow seating of the valve during replacement of the fusible plug.

4. A relief valve comprising inlet and outlet chambers, a pressure relief member normally blocking communication therebetween, a by-pass around the pressure relief member, a spring-loaded vacuum valve in the by-pass, a fusible member in the vacuum valve to relieve upon excessive temperature rise, a shut-off valve located in the by-pass in advance of the vacuum valve, and manually actuated means for normally retaining the shut-off valve in an inoperative position designed to permit closure of the passage by the valve during replacement of the fusible member, the shut-off valve being spring-loaded to permit vacuum relief when the valve is in operation.

IRA I. NELSON.